(12) United States Patent
Benedictus et al.

(10) Patent No.: US 6,427,580 B1
(45) Date of Patent: Aug. 6, 2002

(54) DEVICE FOR HEATING A LIQUID, AND DEEP-FRYING VESSEL WITH SUCH A DEVICE

(75) Inventors: Jan Hans Benedictus; Jacob Hendrik Botma; Klaas Kooyker, all of Drachten (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/963,302

(22) Filed: Sep. 26, 2001

(30) Foreign Application Priority Data

Sep. 27, 2000 (EP) .............................. 00203348

(51) Int. Cl.$^7$ .......................... A47J 37/00; A47J 37/08; H05B 1/02
(52) U.S. Cl. .......................... 99/330; 219/492; 219/494; 219/497; 324/537; 324/760
(58) Field of Search .......................... 99/330–336, 337, 99/338, 403–410, 468, 485, 486; 219/494, 492, 497, 501, 441, 505, 506, 388, 442, 481, 208–210; 324/755–760, 765, 537; 374/102, 103; 437/248; 165/80.2, 80.3

(56) References Cited

U.S. PATENT DOCUMENTS

| | | | |
|---|---|---|---|
| 3,809,858 A | | 5/1974 | Boggs .......................... 219/331 |
| 3,908,111 A | * | 9/1975 | Du Bois et al. ........ 219/492 X |
| 3,919,523 A | | 11/1975 | Wadia et al. ................ 219/494 |
| 4,263,499 A | | 4/1981 | Romance .................... 219/331 |
| 4,315,139 A | * | 2/1982 | Onish et al. ............ 219/497 X |
| 4,421,974 A | * | 12/1983 | Oota et al. ............... 219/494 X |
| 4,587,405 A | * | 5/1986 | Andre ....................... 99/337 X |
| 4,591,698 A | * | 5/1986 | Chang .................... 219/492 X |
| 4,994,652 A | * | 2/1991 | Wolf et al. .................. 219/497 |
| 5,048,400 A | * | 9/1991 | Ueda et al. .................... 99/332 |
| 5,103,280 A | * | 4/1992 | Herring et al. ........... 99/330 X |
| 5,490,449 A | * | 2/1996 | Meister et al. ................ 99/330 |
| 5,643,485 A | * | 7/1997 | Potter et al. ............ 219/494 X |
| 5,727,448 A | * | 3/1998 | Sa ................................ 99/331 |
| 5,844,208 A | * | 12/1998 | Tustaniwskyj et al. ..... 219/494 |
| 6,084,216 A | * | 7/2000 | Slegt et al. ................. 219/497 |

FOREIGN PATENT DOCUMENTS

DE   6944402   11/1969

* cited by examiner

Primary Examiner—Timothy F. Simone

(57) ABSTRACT

A device is provided for heating a liquid in a holder, having a heater element (31) designed to be placed in said holder and to be immersed in liquid in said holder, a temperature sensor (65) for measuring the temperature of the liquid in the holder and coupled to a control unit (41) for the thermostatic control of power supply to the heater element (31), a thermal safety cut-out (60) for interrupting the power supply to the heater element in response to heating-up of the heater element to above a given temperature, which safety cut-out (60) is in thermally conductive contact with the heater element (31), and a carrier (50) which is thermally coupled by means of a thermal coupling to a portion of said heater element which is immersed in the liquid in said holder in the operational state, the temperature sensor (65) of the thermostat being situated on said carrier (50) at a distance from said thermal coupling.

11 Claims, 2 Drawing Sheets

DEVICE FOR HEATING A LIQUID, AND DEEP-FRYING VESSEL WITH SUCH A DEVICE

FIELD OF THE INVENTION

The invention relates to a device for heating a liquid in a holder, comprising:
- a) a heater element designed for placement in said holder and for immersion in said liquid,
- b) a temperature sensor for measuring the temperature of liquid in the holder and coupled to a control unit for the thermostatic control of power supply to the heater element,
- c) a thermal cut-out arranged for interrupting the power supply to the heater element in response to heating of the heater element to above a given temperature, which cut-out is in thermally conductive contact with the heater element, and
- d) a carrier which is thermally coupled via a thermal coupling to a portion of said heater element, which element is immersed in liquid in said holder in the operational state.

BACKGROUND OF THE INVENTION

Such a device is known from German utility model DE-U-6944402. Such heating devices are used, for example, for heating fat in deep-frying pans, but they may alternatively be used for heating other liquids, such as water in a water kettle. The current supply to the heater element is thermostatically controlled in dependence on the sensed temperature of the fat, the temperature sensor of the thermostatic control being present in the fat separated from the heater element. If there is an insufficient quantity of fat in the holder, or if the thermostatic control is defective, it could happen that the current supply to the heater element is not switched off and the heater element or the fat present becomes too hot. The latter may even lead to ignition of the fat.

As a safeguard against such undesirable effects, according to the cited German utility model, a heat protection switch is accommodated in a housing which is in contact with the heater element. This heat protection switch forms a thermal safeguard which prevents overheating of the heater element in the situation described above. The housing in this case extends through the bottom of the holder for containing the fat and forms a support for the heater element adjacent a free end thereof.

A disadvantage of this is that the deep-frying vessel, and in particular the heating device thereof, is of a comparatively complicated construction and is accordingly comparatively vulnerable and expensive.

SUMMARY OF THE INVENTION

It is an object of the invention to provide a heater element for heating liquid in a holder which is of a simpler construction, while retaining a thermostatic temperature control and a thermal protection of the heater element.

A device according to the invention is for this purpose characterized in that the temperature sensor of the thermostat is situated at a distance from said thermal coupling on said carrier.

Since the temperature sensor and the thermal cut-out are provided in a common housing, a single housing suffices for the accommodation of the temperature sensor and the thermal cut-out. Since the temperature sensor of the thermostatic control is located at a distance from the thermal coupling of the housing to the heater element, said sensor will still assume primarily the temperature of the liquid in the holder during operation. The temperature of the temperature sensor is thus influenced by the temperature of the heater element to a minor degree only. This latter temperature indeed stays within a comparatively narrow temperature range during normal operation.

In particularly advantageous embodiments of the invention:
- a) the carrier is formed by a housing which is impermeable to liquids in the operational state when immersed at least partly in liquid, and wherein the temperature sensor and the thermal cut-out are arranged inside the housing (50); and/or
- b) the housing (50) is tubular, and the temperature sensor (65) and the thermal cut-out (60) are situated at a distance from one another in longitudinal direction of the tubular housing; and/or
- c) the housing and the heater element (31) are constructed as an immersion heater with a portion which is substantially vertical in the operational state and which is designed for extending from an edge region of the housing down into the liquid; and/or
- d) the conductors of circuits of which the temperature sensor (65) and the thermal cut-out (60) form part are passed through the housing (50) to the control unit (41); and/or
- e) the heater element (31) has a portion (34) which extends mainly in horizontal direction and a portion (33) which extends mainly in vertical direction, the housing (50) extending substantially alongside said vertical portion (33); and or
- f) the temperature sensor (65) is situated in an end of the carrier (50); and/or
- g) the thermal coupling between the carrier (50) and the heater element (31) is situated adjacent the thermal cut-out (60); and/or
- h) the temperature sensor (65) is constructed as an electronic temperature sensor.

The invention may be advantageously used in a deep-frying apparatus whose holder and heating device are designed so as to match to one another.

BRIEF DESCRIPTION OF THE DRAWINGS

Further aspects, effects, and constructional details of the invention will now be explained in more detail with reference to an embodiment and the drawings, in which.

DETAILED DESCRIPTION OF PREFERRED EMBODIMENTS

Figure 1:
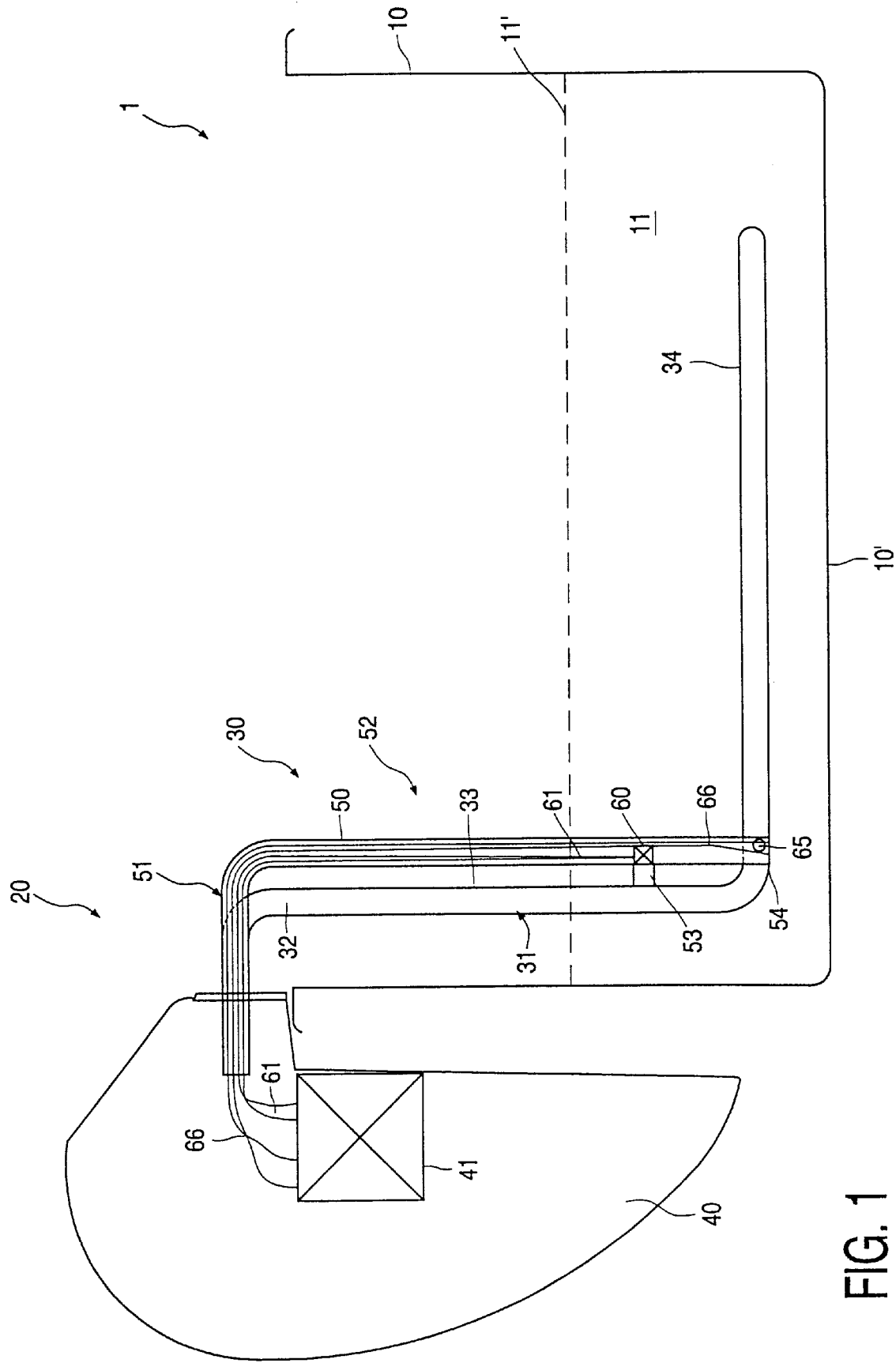
FIG. 1 is a diagrammatic cross-sectional view of an embodiment of a deep-frying apparatus and a device according to the invention.

The embodiment shown in FIG. 1 relates to a deep-frying apparatus 1 and a heating device 20 thereof.

The deep-frying apparatus 1 comprises a pan 10 as the holder, in which a quantity of deep-frying oil or fat is present up to a level 11' in the pan 10 in the operational state as shown. The heating unit 20 is removable and is substantially composed of a heating part 30 and a handle 40 in which a control unit 41 for controlling the current supply to the heating unit 30 is accommodated.

The heating part 30 can be taken from the pan 10 or placed in the pan 10 by means of the handle 40. The pan 10 can thus be easily and fully separated from the electrical heating unit 20. This renders cleaning of the pan 10 easy; it can even be done in a dishwasher.

Figure 2:
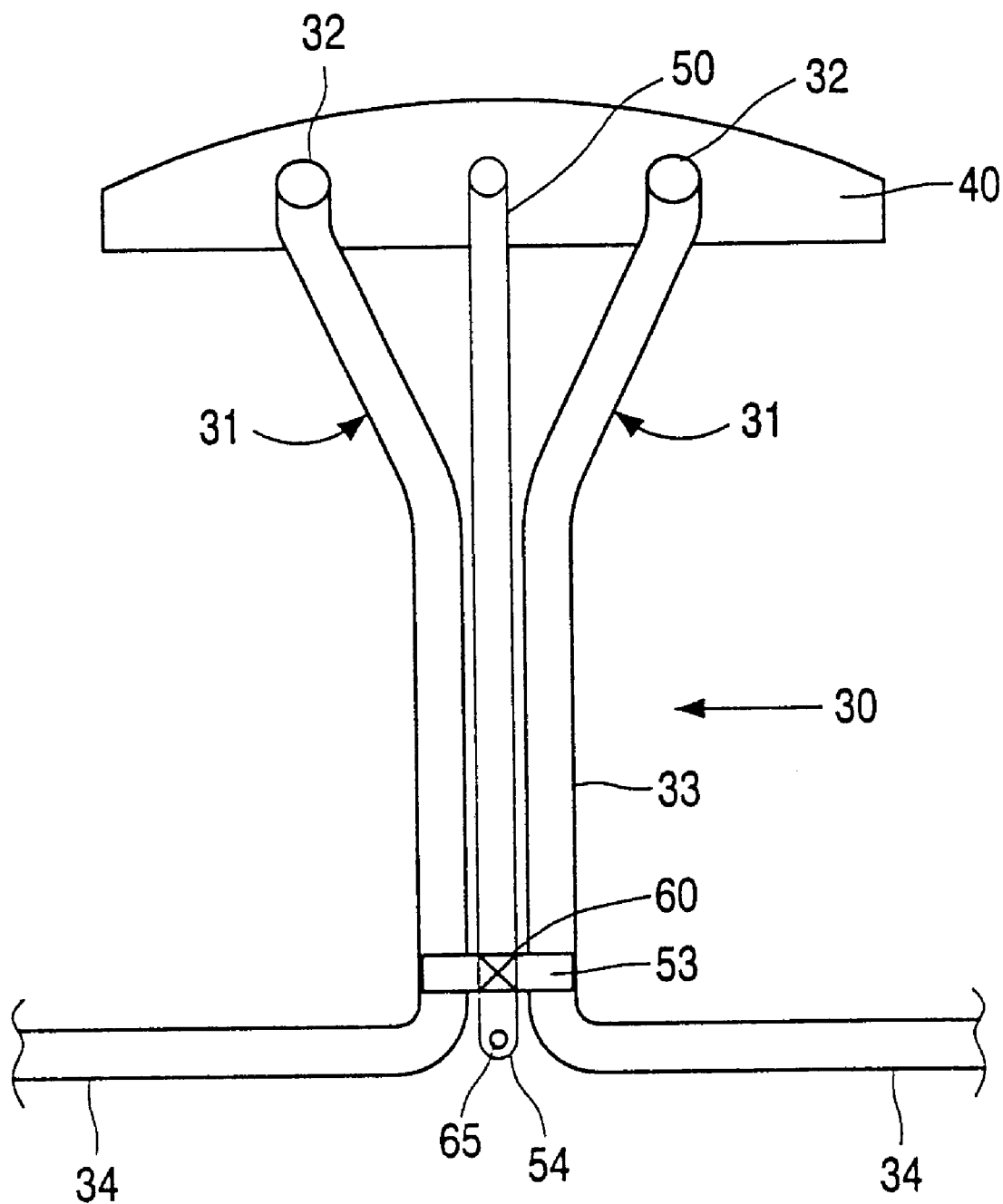
FIG. 2 is a side elevation of part of the device of FIG. 1.

The heating part 30 is provided with a tubular electric heater element 31 (see also FIG. 2) whose two tubular portions 32 extend in horizontal direction from the handle 40 and merge into vertical portions 33, in the operational position shown, and then again into horizontal portions 34 which extend adjacent the bottom 10' of the pan 10 in the operational state. The tubular heater element follows a meandering looped path in the region 34. The heater element 31 is connected to the control 41 accommodated in the handle 40, by means of which unit the heater element 31 can be switched on and off. Such heater elements are known from practice and convert an electric current into heat.

A carrier 50 extends alongside the heater element 31, supporting a thermal cut-out 60 and a temperature sensor 65. In this example, the carrier is constructed as a tubular housing 50 in which the thermal cut-out 60 and the temperature sensor 65 are accommodated. The tubular housing 50 has a fixed end 51 which is connected to the handle 40 and which is substantially parallel to the horizontal portion 32 of the heater element 31. At a distance from the handle 40 and adjacent the vertical portions 33 of the heater element 31, the tubular housing 50 merges into a portion which extends vertically downward, parallel to the vertical portion 33 of the heater element 31. Since the tubular housing 50 runs parallel to the heater element 31 for a major portion, the tubular housing 50 is at least partly screened off by the heater element 31, so that the tubular housing 50 is protected against impacts. Furthermore, an immersion heater of a slim overall shape is obtained thereby, which occupies little space in the pan and accordingly leaves much space for food to be deep-fried.

At a distance from the portions 32 of the heater element 31, which are substantially horizontal during use and which merge into the handle 40, the tubular housing 50 is thermally coupled to a portion 33 of the heater element 31 which lies below the level 11' of the fat 11 in the pan 10 during operation, provided enough fat is present by means of a thermally conducting connecting portion 53.

The end 54 lying in bottom position during use of the housing 50 lies approximately at the level of the horizontal portion 34 of the heater element 31. In the example shown, the end 54 of the tubular housing 50 is slightly below the plane of the horizontal portion 34. The end 54 of the tubular housing 50 is closed off so as to be impermeable to liquid in this example. As a result, the thermal cut-out 60 and the temperature sensor 65 do not come into direct contact with the liquid fat in the pan. This means that the thermal cut-out 60 and the temperature sensor 65 need not be resistant to heated liquids like fat or water, as applicable, and use may be made of, for example, inexpensive electronic temperature sensors. The tubular housing 50 in this example has a circular cross-section. A cross-section of alternative shape, however, is also possible, a cross-section differing from the circular offering the advantage of an enlarged contact surface area with the fat, whereby a more intensive heat transfer between the fat and the housing 50 is obtained. The housing may indeed be other than tubular in shape, but the tubular design offers the advantage that manufacture is simple and the hermetic closure of the housing is safeguarded, while at the same time a guiding and screening of the conductors of the circuits of the sensors in the housing is obtained in a simple manner in the tubular design. Preferably, the housing 50 is manufactured from a thermally conducting material such as, for example, aluminum.

The thermal cut-out 60 is provided in the tubular housing 50 at the level of the connecting portion 53 in the form of a circuit breaker which is capable of interrupting a circuit in which it is connected upon reaching a given maximum admissible temperature. The thermal cut-out 60 is connected with heat conduction to the tubular housing 50, such that heat from the heater element 31 can be transferred to the thermal cut-out 60 via the connecting portion 53 and the wall of the tubular housing 50. The thermal cut-out 60 is connected to the control 41 by means of an electrical wiring 61 which is passed through the tubular housing 50. In the operational state, both the housing and the thermal cut-out are in thermally conductive contact with the oil to be heated, so that the cut-out and the housing are cooled by the oil. The thermal cut out accordingly responds quickly to an insufficient oil level in the pan owing to the disappearance of the cooling effect of the oil. An electrical temperature sensor 65 is accommodated in the tubular housing 50 at a distance from the thermal cut-out 60. The sensor 65 is included in a circuit with wiring 66 extending through the tubular housing 50 and connected to the thermostatic control unit 41. The temperature sensor 65 is in thermally conductive contact with the tubular housing 50 so that the sensor 65 assumes the temperature of the fat present in the pan 10. The wiring 61, 66 is entirely surrounded by the tubular housing 50 from the relevant sensor up to the handle, so that the wiring is well protected against damage during use.

During operation, a quantity of fat or oil 11 is introduced into the pan 10, for example up to a level 11', whereupon the heating unit 20 is put on the edge of the pan 10 and clamped thereon. The horizontal portion 34 of the heater element 31 will then lie below the level 11' of the fat 11. The end 54 of the tubular housing 50 is accordingly also immersed in the fat. Then current is supplied to the heater element 31 under the control of the control unit 41, so that the heater element 31 becomes hot and the fat 11 is heated.

During heating, the control 41 detects the measuring signals coming from the temperature sensor 65 and controls the current supply to the heater element 31 in dependence on the signals received and a possibly preset temperature. In addition, the temperature sensed by the thermal cut-out 60 is detected. Since the thermal cut-out 60 is in thermal contact with the heater element 31, the cut-out primarily assumes the temperature of the heater element 31. The temperature sensor 65, which is indeed situated in the same housing 50 as the thermal cut-out, but at a distance from the latter, in its turn primarily assumes the temperature of the fat 11. For this reason it is advantageous that it is situated approximately at a level with or slightly higher than the heater element 31. It is furthermore advantageous for the heat transfer from the fat to the temperature sensor 65 that the latter lies at the end of the housing 50 where it is more surrounded by the fat whose temperature is to be measured, and not at a distance from the end 54 of the tubular housing 50.

If the temperature detected by the thermal cut-out becomes too high, for example owing to an insufficient quantity of fat in the pan or a defect of the heater element 31 or the temperature sensor 65, the control 41 switches off the heater element 31. A safe operation of the heating device is safeguarded thereby.

The temperature sensor 65 and the thermal cut-out 60 are well protected against damage, for example owing to impacts, in that they are situated in the hollow tubular housing 50. The fact that the sensors are screened off from the fat means that it is also possible to use comparatively simple sensors. In particular, according to the invention, inexpensive electronic temperature sensors may be used.

What is claimed is:

1. A device for heating a liquid in a holder (10), comprising:
   a) a heater element (31) designed for placement in said holder and for immersion in said liquid,
   b) a temperature sensor (65) arranged for measuring the temperature of liquid in the holder and coupled to a control unit (41) for the thermostatic control of power supply to the heater element (31),
   c) a thermal cut-out (60) for interrupting the power supply to the heater element in response to heating of the heater element to above a given temperature, which cut-out (60) is in thermally conductive contact with the heater element (31), and
   d) a carrier (50) which is thermally coupled via a thermal coupling to a portion of said heater element, which element is immersed in liquid in said holder in the operational state, characterized in that the temperature sensor (65) is situated at a distance from said thermal coupling on said carrier (50).

2. A device as claimed in claim 1, wherein the carrier (50) is formed by a housing which is impermeable to liquids in the operational state when immersed at least partly in liquid, and wherein the temperature sensor and the thermal cut-out are arranged inside the housing (50).

3. A device as claimed in claim 2, wherein the housing (50) is tubular, and the temperature sensor (65) and the thermal cut-out (60) are situated at a distance from one another in longitudinal direction of the tubular housing.

4. A device as claimed in claim 2, wherein the housing (50) and the heater element (31) are constructed as an immersion heater with a portion which is substantially vertical in the operational state and which is designed for extending from an edge region of the housing down into the liquid.

5. A device as claimed in claim 4, wherein conductors of circuits of which the temperature sensor (65) and the thermal cut-out (60) form part are passed through the housing (50) to the control unit (41).

6. A device as claimed in claim 4, wherein the heater element (31) has a portion (34) which extends mainly in horizontal direction and a portion (33) which extends mainly in vertical direction, the housing (50) extending substantially alongside said vertical portion (33).

7. A device as claimed claim 1, wherein the temperature sensor (65) is situated in an end of the carrier (50).

8. A device as claimed in claim 1, wherein said thermal coupling between the carrier (50) and the heater element (31) is situated adjacent the thermal cut-out (60).

9. A device as claimed in claim 2, wherein the temperature sensor (65) is constructed as an electronic temperature sensor.

10. A deep-frying apparatus provided with a device as claimed in claim 1 with a holder (10) for accommodating a liquid to be heated.

11. A deep-frying apparatus as claimed in claim 10, wherein said device in the operational state extends from an edge region of said holder to adjacent a bottom (10') of said holder (10).

* * * * *